(12) United States Patent
Giraud et al.

(10) Patent No.: US 11,409,066 B2
(45) Date of Patent: *Aug. 9, 2022

(54) REPLACEABLE ENTRY MODULE FOR CABLES AND METHOD

(71) Applicant: CORNING RESEARCH & DEVELOPMENT CORPORATION, Corning, NY (US)

(72) Inventors: William Julius McPhil Giraud, Azle, TX (US); Brian Duane Kingsbury, Watauga, TX (US); Robert Tomasz Klak, Zdunska Wola (PL)

(73) Assignee: Corning Research & Development Corporation, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/031,051

(22) Filed: Sep. 24, 2020

(65) Prior Publication Data

US 2021/0003800 A1 Jan. 7, 2021

Related U.S. Application Data

(63) Continuation of application No. PCT/US2019/024929, filed on Mar. 29, 2019.

(60) Provisional application No. 62/652,669, filed on Apr. 4, 2018.

(51) Int. Cl.
*G02B 6/00* (2006.01)
*G02B 6/44* (2006.01)

(52) U.S. Cl.
CPC ......... *G02B 6/4444* (2013.01); *G02B 6/4452* (2013.01)

(58) Field of Classification Search
CPC ....... G02B 6/4444; G02B 6/4452; G02B 6/00
See application file for complete search history.

(56) References Cited

U.S. PATENT DOCUMENTS

| 5,071,220 A | 12/1991 | Ruello et al. |
| 6,097,872 A * | 8/2000 | Kusuda ................ G02B 6/4455 174/50 |
| 6,378,498 B2 | 4/2002 | Kohketsu et al. |
| 6,792,191 B1 | 9/2004 | Clapp et al. |
| 6,792,919 B2 | 9/2004 | Kohketsu et al. |

(Continued)

OTHER PUBLICATIONS

International Search Report and Written Opinion of the International Searching Authority; PCT/US2019/024929; dated Aug. 5, 2019; 12 Pages; European Patent Office.

*Primary Examiner* — Jennifer Doan
(74) *Attorney, Agent, or Firm* — Grant A. Gildehaus

(57) ABSTRACT

An entry module for facilitating passage of one or more cables into an enclosure may include first and second module plates. The first module plate may include a first edge defining a first edge profile, and the second module plate may include a second edge defining a second edge profile. The first and second module plates may be configured to approach one another, such that the first edge profile and the second edge profile define one or more apertures for receiving a cable passing from exterior the enclosure to the interior of the enclosure. The first edge profile may define first aperture portions and first edge segments between at least some of the first aperture portions, and the second edge profile may define second aperture portions and second edge segments between at least some of the second aperture portions. The first and second aperture portions may define the apertures.

15 Claims, 5 Drawing Sheets

(56) References Cited

U.S. PATENT DOCUMENTS

| | | |
|---|---|---|
| 7,132,605 B2 | 11/2006 | Holmberg et al. |
| 7,273,985 B2 | 9/2007 | Holmberg et al. |
| 7,925,135 B2 | 4/2011 | Mullaney et al. |
| 7,937,818 B2 | 5/2011 | Holmberg et al. |
| 7,970,249 B2 | 6/2011 | Solheid et al. |
| 9,188,760 B2 | 11/2015 | Kowalczyk et al. |
| 9,523,834 B2 | 12/2016 | Kowalczyk et al. |
| 9,581,271 B2 | 2/2017 | Haynes et al. |
| 9,594,227 B2 | 3/2017 | Schurmans et al. |
| 9,791,653 B2 | 10/2017 | Aznag et al. |
| 10,365,449 B2 | 7/2019 | Thompson et al. |
| 10,436,999 B2 | 10/2019 | Amaya et al. |
| 10,444,455 B2 | 10/2019 | Aznag et al. |
| 10,520,695 B2 | 12/2019 | Jaksons et al. |
| 10,976,511 B2 * | 4/2021 | Brown ................ G02B 6/4444 |
| 2002/0002964 A1 | 1/2002 | Kohketsu et al. |
| 2002/0092504 A1 | 7/2002 | Kohketsu et al. |
| 2006/0219426 A1 | 10/2006 | Holmberg et al. |
| 2007/0089894 A1 | 4/2007 | Holmberg et al. |
| 2007/0278005 A1 | 12/2007 | Holmberg et al. |
| 2009/0252472 A1 | 10/2009 | Solheid et al. |
| 2010/0054689 A1 | 3/2010 | Mullaney et al. |
| 2011/0217017 A1 | 9/2011 | Drouard et al. |
| 2011/0255837 A1 | 10/2011 | Solheid et al. |
| 2013/0209049 A1 | 8/2013 | Kowalczyk et al. |
| 2015/0054229 A1 | 2/2015 | Haynes et al. |
| 2015/0168663 A1 | 6/2015 | Aznag et al. |
| 2015/0301298 A1 * | 10/2015 | Frith ................ G02B 6/4441 385/135 |
| 2016/0147030 A1 | 5/2016 | Kowalczyk et al. |
| 2016/0195687 A1 | 7/2016 | Schurmans et al. |
| 2017/0003467 A1 | 1/2017 | Jaksons et al. |
| 2018/0039037 A1 | 2/2018 | Aznag et al. |
| 2018/0074275 A1 | 3/2018 | Thompson et al. |
| 2018/0246289 A1 | 8/2018 | Amaya et al. |
| 2019/0064463 A1 * | 2/2019 | Bandy ................ G02B 6/445 |
| 2019/0377144 A1 | 12/2019 | Cruz et al. |
| 2020/0003981 A1 | 1/2020 | Brown et al. |
| 2020/0049916 A1 | 2/2020 | Aznag et al. |

* cited by examiner

REPLACEABLE ENTRY MODULE FOR CABLES AND METHOD

PRIORITY APPLICATION

This application is a continuation of International Application No. PCT/US19/24929, filed on Mar. 29, 2019, which claims the benefit of priority to U.S. Application No. 62/652,669, filed on Apr. 4, 2018, both applications being incorporated herein by reference.

BACKGROUND

This disclosure relates to entry modules for cables, and more particularly, to replaceable entry modules for facilitating entry of cables into an enclosure and related methods.

Cabinets may be used to enclose and protect equipment, such as, for example, fiber optic equipment associated with fiber optic cables including optical fibers. For example, fiber optic equipment may be enclosed in cabinets and provide connections and circuitry for facilitating broadband voice, video, and data transmission. One example of a cabinet for enclosing fiber optic equipment is a fiber optic distribution outdoor cabinet, some of which may be intended to be installed in an outdoor environment exposed to the elements. In order to protect cables and equipment inside the cabinet, some such cabinets are constructed to provide a fluid-resistant barrier between the interior of the cabinet and the surroundings. However, the construction of such cabinets may suffer from a number possible drawbacks. For example, the construction of such cabinets often renders it difficult or impossible to repair or replace some parts of the cabinet and/or the cables and equipment inside the cabinet without replacing large portions of the cabinet, or even the entire cabinet. In addition, the portion of the cabinet at the location at which cables enter the cabinet cannot be removed or replaced without disconnecting the cables from the respective connection points inside the cabinet, which may render its removal or replacement difficult and time consuming.

Some examples described herein may address one or more of these possible drawbacks.

SUMMARY

The present disclosure is generally directed to an entry module for facilitating passage of one or more cables into an enclosure. The entry module may include a first module plate including a first edge defining a first edge profile, and a second module plate including a second edge defining a second edge profile. The first module plate and the second module plate may be configured to approach (e.g., abut) one another, such that the first edge profile and the second edge profile define at least one aperture therebetween. In some examples, the first module plate and the second module plate may be configured to approach (e.g., abut) one another, such that the first edge profile and the second edge profile define a plurality of apertures therebetween. For example, the first edge profile may define first aperture portions and first edge segments between at least some of the first aperture portions, and the second edge profile may define second aperture portions and second edge segments between at least some of the second aperture portions. In some examples, the first module plate and the second module plate may be configured to approach (e.g., abut) one another, such that at least some of the first edge segments approach (e.g., abut) at least some of the second edge segments, and at least some of the first aperture portions and at least some of the second aperture portions define the plurality of apertures.

The present disclosure is also generally directed to an enclosure defining an interior and an exterior. The enclosure may include a frame and a plurality of panels coupled to the frame and configured to define the interior and the exterior of the enclosure. The enclosure may also include a floor defining a bottom of the enclosure and including an entry module coupled to the enclosure and configured to facilitate passage of at least one cable into the enclosure. In some examples, the entry module may include a first module plate including a first edge defining a first edge profile, and a second module plate including a second edge defining a second edge profile. The first module plate and the second module plate, in some examples, may be configured to approach (e.g., abut) one another, such that the first edge profile and the second edge profile define at least one aperture therebetween. For example, the first module plate and the second module plate may approach (e.g., abut) one another, such that the first edge profile and the second edge profile define a plurality of apertures therebetween. In some examples, the first edge profile may define first aperture portions and first edge segments between at least some of the first aperture portions, and the second edge profile may define second aperture portions and second edge segments between at least some of the second aperture portions. The first module plate and the second module plate may approach (e.g., abut) one another, such that at least some of the first edge segments approach (e.g., abut) at least some of the second edge segments, and at least some of the first aperture portions and at least some of the second aperture portions define the plurality of apertures.

The present disclosure is also generally directed to a method for removing an entry module from an enclosure including a frame and a plurality of panels coupled to the frame and defining an interior and an exterior of the enclosure. The entry module may include a first module plate and a second module plate coupled to one another and defining at least one aperture through which at least one cable passes from the exterior of the enclosure to the interior of the enclosure to at least one respective connection point. The method may include at least partially uncoupling at least one of the plurality of panels from the frame, uncoupling the first module plate from the enclosure, and uncoupling the first module plate and the second module plate from one another. The method may also include removing the first module plate from the enclosure without disconnecting the at least one cable from the at least one respective connection point. In some examples of the method, uncoupling the first module plate from the enclosure may include uncoupling the first module plate from the frame. In some examples, the first and/or second module plates may be coupled to the frame via a floor of the enclosure, and thus, in some such examples, uncoupling the first and/or second module plates from the frame may include uncoupling the first and/or second module plates from the floor. In some examples of the method, it may also include uncoupling the second module plate from the enclosure, and removing the second module plate from the enclosure without disconnecting the at least one cable from the at least one respective connection point.

DETAILED DESCRIPTION

Figure 1:
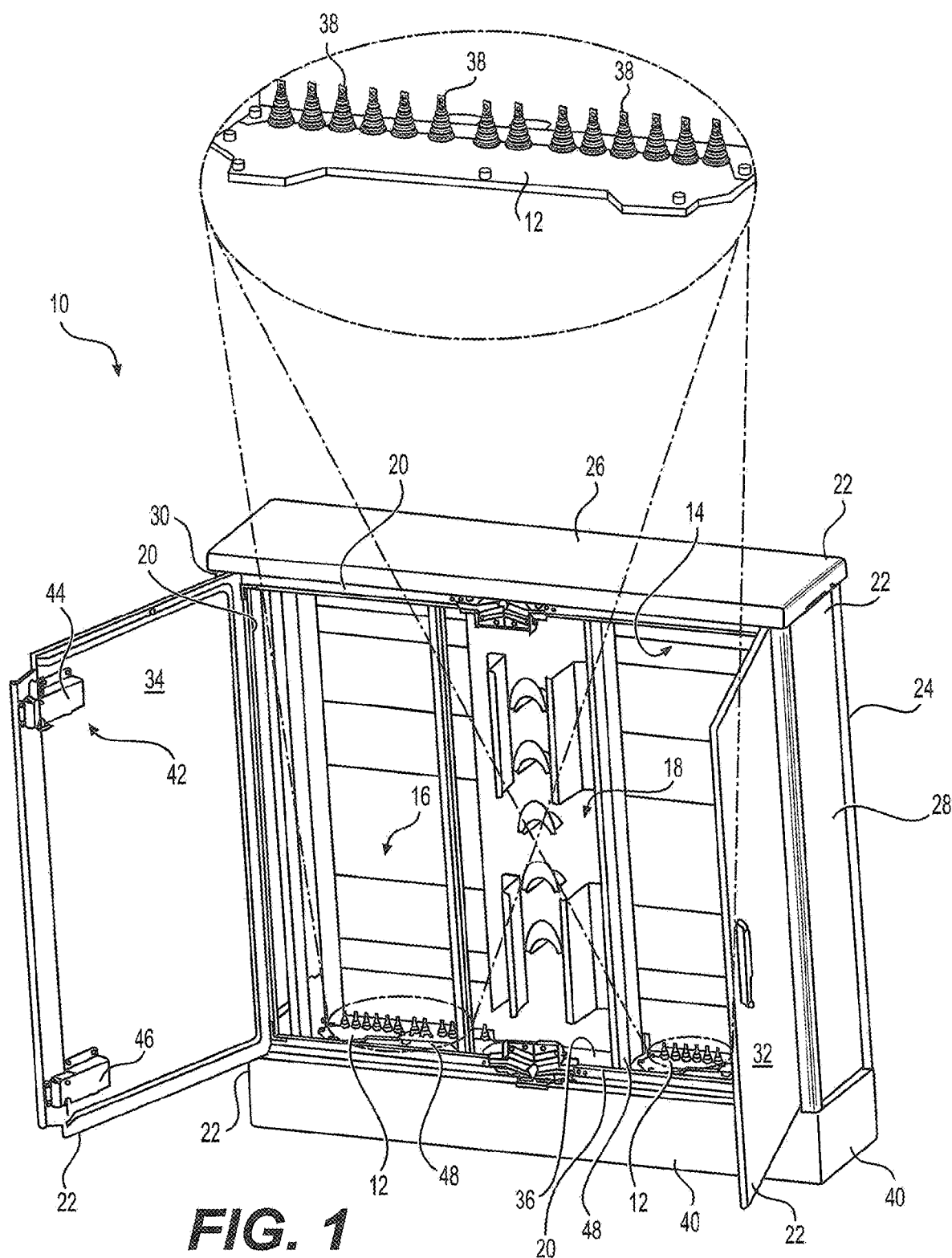
FIG. 1 is a schematic perspective view of an example enclosure including a detailed perspective view of an example entry module for facilitating entry of a plurality of cables into the enclosure.

Reference will now be made in detail to embodiments, examples of which are illustrated in the accompanying drawings. Whenever possible, the same reference numbers are used throughout the drawings to refer to the same or like parts.

This disclosure is generally directed to entry modules for cables, and more particularly, to replaceable entry modules for facilitating entry of cables into an enclosure and related methods. According to some examples, the enclosures described herein may be assembled on site and may be scalable to meet the capacity requirements of the equipment being enclosed by the enclosure. For example, some examples of the enclosure may be formed by a frame assembled from frame members coupled to one another by brackets. The frame members may be provided (or modified on-site) to build a frame (e.g., off-site or on-site) defining the desired interior dimensions, and the brackets may be used to couple the frame members to one another. Thereafter, panels may be attached to the frame to create the enclosure. In some examples, one or more of the panels may be pivotally coupled to the frame to provide one or more doors configured to pivot between open and closed orientations. The enclosure may include an entry module configured to facilitate entry of one or more cables from exterior the enclosure to the interior of the enclosure. In some examples, the entry module may be configured to be at least a part of the floor of the enclosure, and in some examples, the entry module may be part of another portion of the enclosure, such as, for example, at least a part of the back side of the enclosure, at least a part of a side of the enclosure, at least of part of the top of the enclosure, or at least a part of the front side of the enclosure. In some examples, the equipment to be enclosed in the enclosure may be assembled and/or coupled to the interior of the enclosure during and/or after completion of assembly of the enclosure.

In some examples, the entry module may be configured such that at least a portion of the entry module may be repaired or replaced without disconnecting the cables from cable connection points in the interior of the enclosure. For example, access to the entry module may be gained by repositioning or removal of one or more panels of the enclosure. In some examples, access to the entry module may be gained by opening one of more of the door panels. In some examples, access to the entry module may be gained by removing one or more back panels of the enclosure. Once access to the entry module has been gained, one or more portions of the entry module may be repositioned, repaired, and/or removed. For example, the entry module may include two or more selectively separable module plates that form one or more apertures through which one or more cables enter the enclosure. In some examples, because the module plate being removed includes a portion of an aperture that does not completely surround one or more of the cables, the module plate may be removed without necessarily disconnecting the one or more cables from their respective connection points. In some examples, two or more module plates define one or more of the apertures through which the one or more cables pass, and thus, either or both of such module plates may be removed without disconnecting the one or more cables from the respective connection points of the cables in the interior of the enclosure. This example configuration may render repair and/or replacement of one or more portions of the entry module much easier and less time consuming.

FIG. 1 is a schematic perspective view of an example enclosure 10 including a detailed perspective view of an example entry module 12. The example enclosure 10 shown in FIG. 1 is a cabinet for enclosing fiber optic equipment, such as fiber optic cables including optical fibers, and connections and circuitry for facilitating broadband voice, video, and data transmission. In some examples, the enclosure 10 may be a fiber optic distribution outdoor cabinet, which may be intended to be installed in an outdoor environment exposed to the elements. Other types of enclosures for enclosing other types of equipment are contemplated.

As shown in FIG. 1, the example enclosure 10 defines an interior 14 and an exterior 16. In the example shown, the interior 14 includes various structures 18 known to those skilled in the art for facilitating routing and/or connection of fiber optic cables including optical fibers. The example enclosure 10 shown includes a frame 20 and a plurality of exterior panels 22 secured to the frame 20 for enclosing the interior 14 of the enclosure 10. For example, the enclosure 10 includes a back panel 24 coupled to a back side of the frame 20, a top panel 26 coupled to a top side of the frame 20, a first side panel 28 coupled to a first side of the frame 20, a second side panel 30 coupled to a second side of the frame 20 opposite the first side panel 28, a first door panel 32 coupled to a front side of the frame 20 such that it pivots with respect to the frame 20, and a second door panel 34 coupled to a front side of the frame 20 such that it pivots with respect to the frame 20. In some examples, the enclosure 10 also includes a bottom panel 36 coupled to a bottom side of the frame 20.

In some examples, the bottom panel 36 may include an opening configured to receive therein the entry module 12. In some examples, the entry module 12 may form the majority (or entirety) of the bottom panel 36. As explained herein, the entry module 12 facilitates entry of cables, such as, for example, fiber optic cables, into the interior 14 of the enclosure 10. In some examples, one or more seals 38 may be provided to provide a substantially fluid-resistant seal (e.g., a fluid-tight seal) between each of the one or more cables and the entry module 12, for example, as explained in more detail herein. In some examples, the seals 38 may include one or more of natural rubber, synthetic rubber, and plastics, and/or any other suitable materials (e.g., suitable elastic materials or gasket-like materials) for providing a fluid-resistant seal.

The example enclosure 10 shown in FIG. 1 also includes a skirt 40 coupled to and extending around the periphery of the bottom of the frame 20, which provides protection for cables entering the interior 14 of the enclosure 10 through the bottom panel 36. One or more of the first door panel 32 or the second door panel 34 may include a latch assembly 42 for securing the first and second door panels 32 and 34 in the closed orientation. In the example shown, the latch assembly 42 includes an upper latch mechanism 44 and a lower latch mechanism 46, each including a keeper configured to selectively engage a respective upper member of the frame 20 and lower member of the frame 20. Although FIG. 1 shows the latch assembly 42 coupled to an interior side of the second door panel 34, in some examples, a second latch mechanism may be coupled to the interior side of the first door panel 32.

Figure 2:
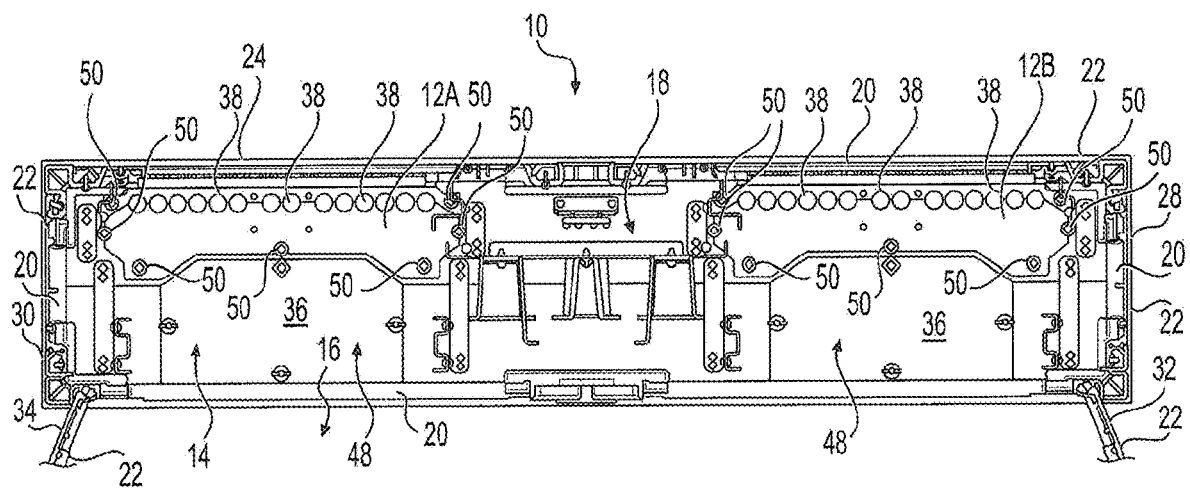
FIG. 2 is a schematic plan cutaway view showing the interior of the example enclosure shown in FIG. 1 from above.

FIG. 2 is a schematic plan cutaway view showing the interior 14 of the example enclosure 10 shown in FIG. 1 from above with the top panel 26 and at least some contents of the enclosure 10 removed to view the example bottom panel 36 and the example entry module 12. In the example shown, the bottom panel 36 forms a majority of the floor 48 of the enclosure 12. In some examples, the bottom panel 36 may be a single piece unitary construction, and in other examples, the bottom panel 36 may be formed from two or more panels coupled to one another to form the majority of the floor 48. The example shown in FIG. 2 includes two entry modules 12A and 12B. Some examples may only include a single entry module 12, and other examples may include more than two entry modules 12. In the example shown, each of the entry modules 12A and 12B is removably coupled to the bottom panel 36 by fasteners 50, such as, for example, screws and/or nuts and bolts. Other ways of removably coupling the entry modules 12A and 12B to the bottom panel 36 are contemplated. In some examples, a seal or gasket (not shown) may be provided between the perimeter of one or more of the entry modules 12A or 12B and the bottom panel 36 to provide a substantially fluid-resistant seal (e.g., a fluid-tight seal) between one or more of the entry modules 12A or 12B and the bottom panel 36.

Figure 3:
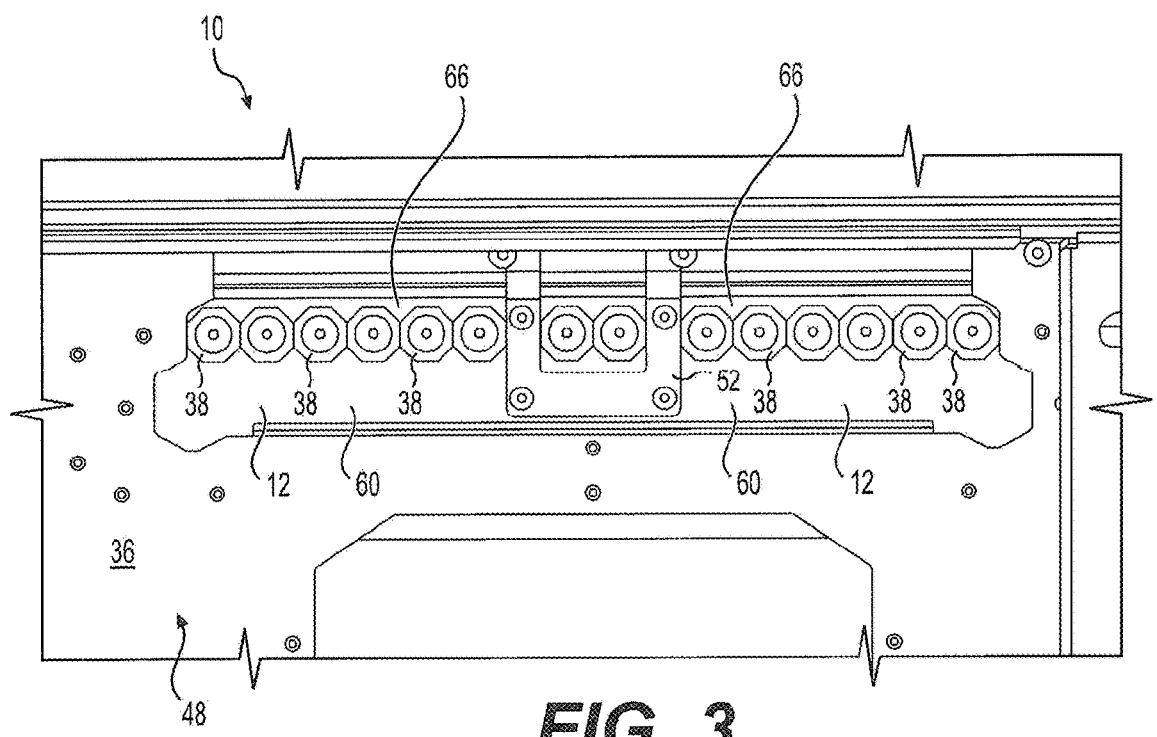
FIG. 3 is a partial schematic plan view of the example enclosure shown in FIG. 1 showing an example entry module from below.

FIG. 3 is a partial schematic plan view of the example enclosure 10 shown in FIG. 1 showing the example entry module 12 from below. FIG. 3 shows the underside of one of the example entry modules 12A show in FIG. 2. As shown in FIG. 3, the example entry module 12 is coupled to the portion of the enclosure 10 by an example attachment bracket 52, which may be coupled to either or both the entry module 12 and the interior 14 of the enclosure 10. In some examples, a plurality of the seals 38 may be provided to provide a fluid-resistant seal (e.g., a fluid-tight seal) between each cable that enters the enclosure 10 and the entry module 12, for example, as explained in more detail herein. The example shown in FIG. 3 includes fourteen seals 38 for receiving fourteen cables. Fewer or more seals 38 and cables are contemplated.

Figure 4:
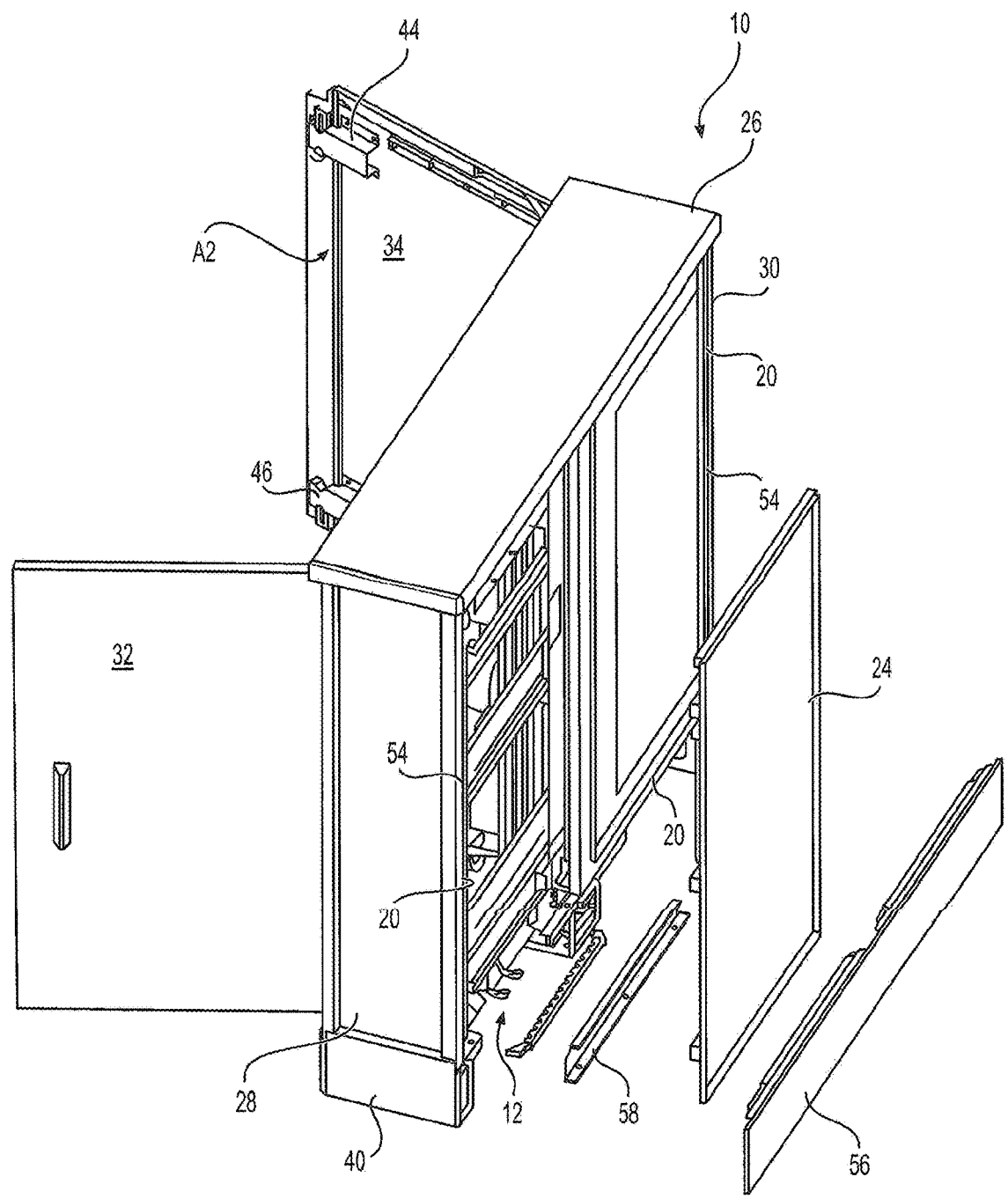
FIG. 4 is schematic perspective exploded view of the example enclosure shown in FIG. 1.
Figure 5:
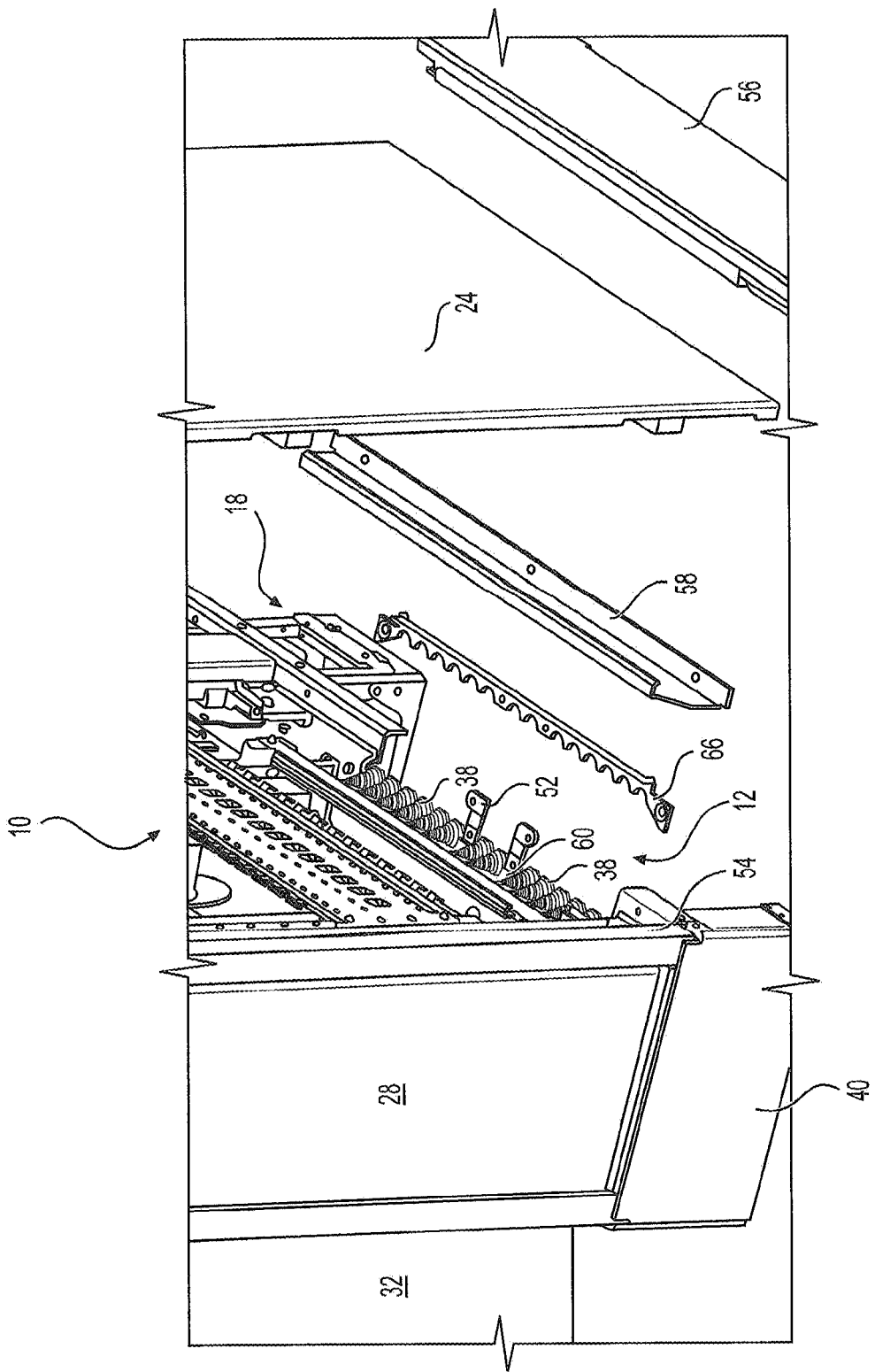
FIG. 5 is a schematic detailed view of the example enclosure shown in FIG. 4.

FIGS. 4 and 5 are schematic perspective exploded views of the example enclosure 10 shown in FIG. 1, with the back panel 24 and a portion of the skirt 40 removed, for example, to show access to the example entry module 12. As shown in FIGS. 4 and 5, the back panel 24 may be removed, for example, by separating it from a back side 54 of the frame 20. For example, the back panel 24 may be removably coupled to the frame 20 by one or more fasteners, and the one or more fasteners may be removed to facilitate removal of the back panel 24 from the back side 54 of the frame 20. In some examples, a back side 56 of the skirt 40 and/or a lower back side frame member 58 may also be removed, for example, to provide access to the entry module 12. In some examples, the attachment bracket 52 may be removably coupled to the lower back side frame member 58 and/or the bottom panel 36, for example, via one or more fasteners.

Figure 6:
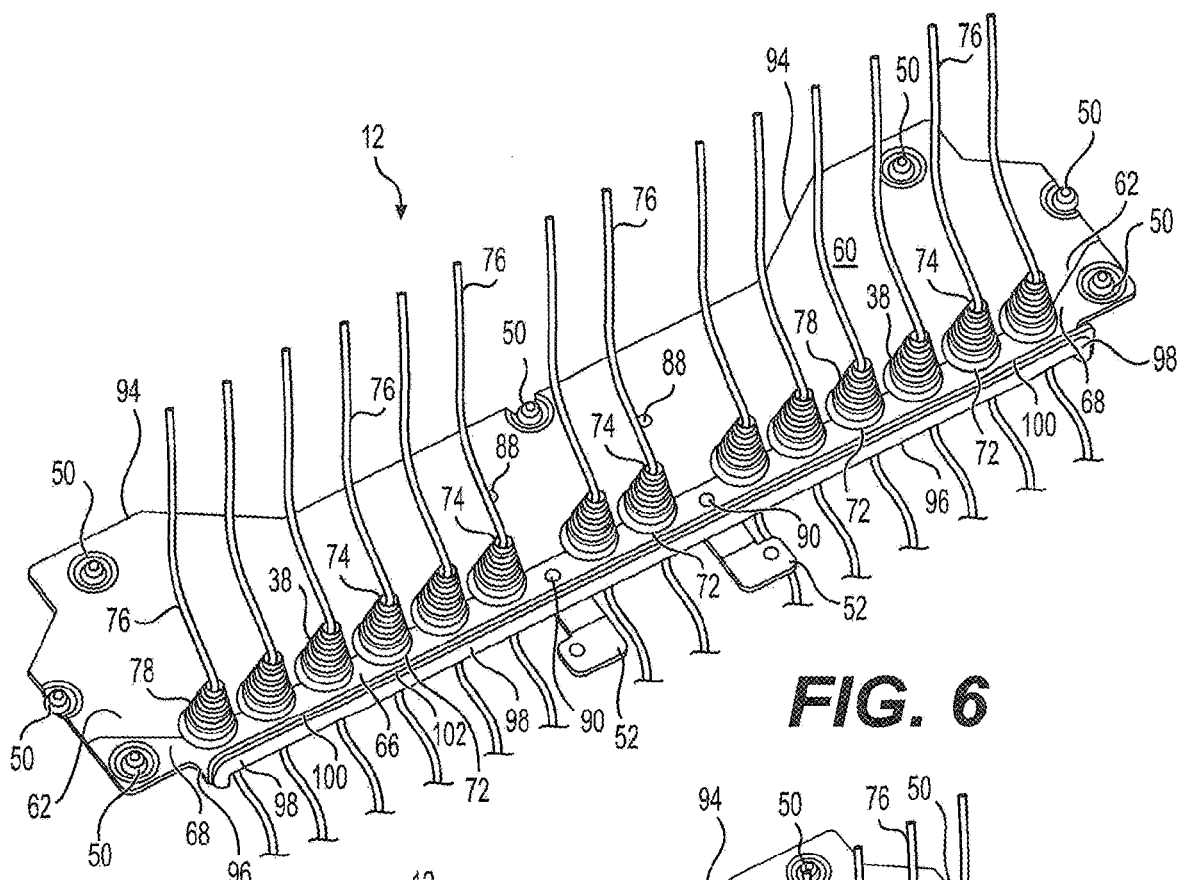
FIG. 6 is a schematic perspective view of an example entry module.
Figure 7:
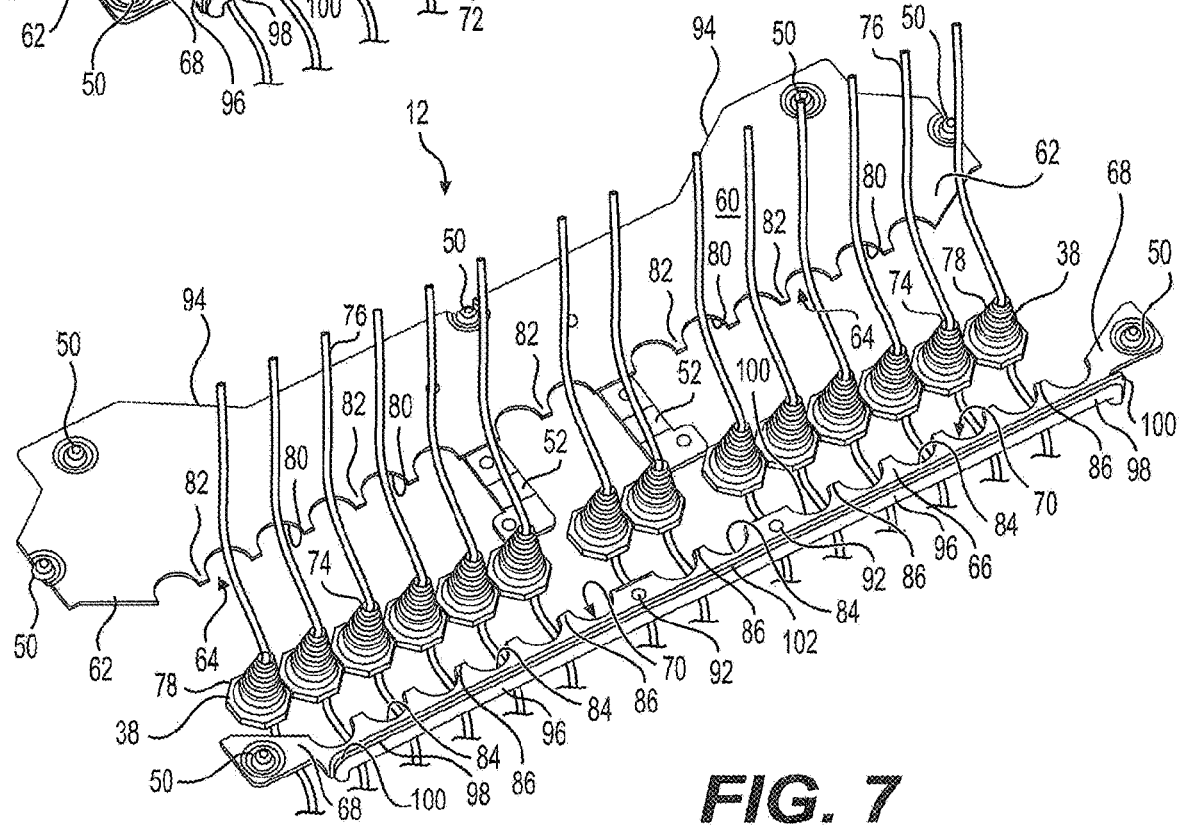
FIG. 7 is a schematic exploded perspective view of the example entry module shown in FIG. 6.

FIGS. 6 and 7 are a schematic perspective view of an example entry module 12 and an exploded perspective view of the example entry module 12 shown in FIG. 6. In the example shown in FIGS. 6 and 7, the entry module 12 includes a first module plate 60 including a first edge 62 defining a first edge profile 64. The example entry module 12 also includes a second module plate 66 including a second edge 68 defining a second edge profile 70. In some examples, such as the example shown, the first module plate 60 and the second module plate 66 are configured to approach (e.g., abut) one another (see FIG. 6), such that the first edge profile 64 and the second edge profile 70 define one or more apertures 72 therebetween (see FIG. 7). In some examples, the first module plate 60 and the second module plate 66 are configured to approach one another, such that they are separated by a marrow gap that may be, in some examples, sealed, for example, with a seal-like structure and/or using a caulk-like material. Features described herein as being associated with the first module plate 60 may instead be associated with the second module plate 66, and features described herein as being associated with the second module plate 66 may instead be associated with the first module plate 60.

In the examples shown in FIGS. 6 and 7, a plurality of the seals 38 may be coupled to the entry module 12, and each of the seals 38 may define an interior passage 74 through which a respective cable 76 may pass. As explained above, the seals 38 may be configured to provide a fluid-resistant seal (e.g., a fluid-tight seal) between an outer surface of a respective cable 76 and an interior surface defined by the interior passage 74 of a respective seal 38, and a fluid-resistant-seal (e.g., a fluid-tight seal) between an exterior surface 78 of the respective seal 38 and an interior surface of the respective aperture 72 of the entry module 12. For example, a respective cable 76 may pass through an interior passage 74 from exterior 16 relative to the enclosure 12 to the interior 14 of the enclosure 12. In some examples, the seals 38 may be coupled to the first and second module plates 60 and 66 by coupling the first and second module plates 60 and 66 to one another, such that the seals 38 are received in the apertures 72. For example, the exterior surface 78 of the seal 38 may be configured to secure the seal 38 to an edge of a respective aperture 72, for example, such that a fluid-resistant seal (e.g., a fluid-tight seal) is provided.

In the example shown in FIGS. 6 and 7, the first edge profile 64 defines first aperture portions 80 and first edge segments 82 between at least some of the first aperture portions 80. The example second edge profile 70 defines second aperture portions 84 and second edge segments 86 between at least some of the second aperture portions 84. In some examples, the first module plate 60 and the second module plate 66 are configured to approach (e.g., abut) one another, such that at least some of the first edge segments 82 approach (e.g., abut) at least some of the second edge segments 86, and at least some of the first aperture portions 80 and at least some of the second aperture portions 84 define the plurality of apertures 72. In the example shown, the example apertures 72 defined by the first and second apertures portions 80 and 84 are substantially circular. In some examples, one or more of the apertures 72 may have a shape other than substantially circular. For example, one or more of the apertures 72 may be polygonal in shape (e.g., square-shaped, pentagonal-shaped, hexagonal-shaped, octagonal-shaped, etc.). In the example shown in FIGS. 6 and 7, each of the first and second aperture portions 80 and 84 are substantially identical. In some examples, the first and second aperture portions 80 and 84 may be different. In some examples, either the first aperture portions 80 or the second aperture portions 84 may be substantially a continuation of the respective first edge segments 82 or the second edge segments 86, for example, such that the first edge profile 64 or the second edge profile 70 is substantially colinear.

In the example shown in FIGS. 6 and 7, the first edge segments 82 and the second edge segments 86 are substantially straight segments. In some examples, the first and second edge segments 82 and 86 may define complimentary but non-straight segments, such as, for example, interfitting square waves, interfitting sinusoidal waves, interfitting saw tooth profiles, etc. Such examples may serve to register the first module plate 60 with the second module plate 66, for example, such that the first and second aperture portions 80 and 84 are aligned with one another. In some examples, one or more of the first edge segments 82 and one or more of the second edge segments 86 may define edge segments having different shapes.

In the example shown in FIGS. 6 and 7, the first module plate 60 lies substantially in a first plane, and the second module plate 66 lies substantially in a second plane. Although lying in respective planes, one or more of the first module plate 60 or the second module plate 66 may also include non-planar aspects. In some examples, the first module plate 60 and the second module plate 66 are configured to approach (e.g., abut) one another, such that the first plane and the second plane are substantially coplanar and/or substantially parallel with respect to one another.

In some examples, the attachment bracket 52 may be coupled (e.g., removably) to one or more of the first module plate 60 or the second module plate 66. In some examples, the attachment bracket 52 may be configured to removably couple the entry module 12 to the enclosure 10. For example, the attachment bracket 52 may be configured to removably couple the entry module 12 to the interior 14 and/or exterior 16 of the enclosure 12, for example, to the frame 20 (e.g., to the lower back side frame member 58) and/or to the bottom panel 36. In the example shown in FIGS. 6 and 7, the attachment bracket 52 is removably coupled to the first module plate 60 (e.g., via one or more fasteners 88) (FIG. 7), and is removably coupled to the second module plate 66 (e.g., via one or more fasteners 90). For example, the example second module plate 66 shown in FIGS. 6 and 7 includes holes 92 configured to receive the example fasteners 90. In the example shown, the attachment bracket 52 serves to removably couple the first and second module plates 60 and 66 to one another. In some examples, the attachment bracket 52 may include two or more parts.

As shown in FIGS. 6 and 7, in some examples, the first module plate 60 defines a first remote edge 94 opposite the first edge 62, and the second module plate 66 defines a second remote edge 96 opposite the second edge 68, and the entry module 12 may also include at least one edge seal 98 coupled to one or more of the first remote edge 94 or the second remote edge 96. For example, as shown in FIGS. 6 and 7, the second remote edge 96 defines an edge flange 100, and the edge seal 98 is coupled to an outboard side 102 of the edge flange 100. The edge seal 98, in some examples, may provide a fluid-resistant seal (e.g., a fluid-tight seal) between the entry module 12 (e.g., the second module plate 66) and the interior 14 of the enclosure 12. In some examples, the edge seal 98 may be adhesively secured to the edge flange 100. (Even though the example second module plate 66 includes the example edge flange 100, the second module plate 66 lies substantially in a plane.)

An example process for removing examples of the entry module from an example enclosure is now described. In some examples of the process, the enclosure may include a frame and a plurality of panels coupled to the frame and defining the interior and the exterior of the enclosure. In some examples, the entry module may include a first module plate and a second module plate coupled to one another and defining at least one aperture through which at least one cable passes from the exterior of the enclosure to the interior of the enclosure to at least one respective connection point. In some examples, the process may include at least partially uncoupling one or more of the panels from the frame. The process may also include uncoupling the first module plate from the enclosure, and uncoupling the first module plate and the second module plate from one another. In some examples, removable fasteners may couple the first module plate to the enclosure, and/or removable fasteners may couple the first module plate and the second module plate to one another. The removable fasteners may be removed, uncoupling the first module plate from the enclosure, and uncoupling the first module plate and the second module plate from one another. In some examples, the first module plate may be removed from the enclosure without disconnecting the one or more cables from the at least one respective connection point.

In some examples of the process, uncoupling the first module plate from the enclosure may include uncoupling the first module plate from the frame. For example, the first module plate may be coupled to the frame by removable fasteners, and the process may include removing the removable fasteners to remove the first module plate from the frame. In some examples, the process may also include uncoupling the second module plate from the enclosure, and removing the second module plate from the enclosure without disconnecting the at least one cable from the at least one respective connection point.

In some examples, the process may include re-installing an entry module, for example, following repair and/or as part of replacing at least a portion of the entry module. In such examples, the process may include coupling the entry module to the enclosure. In some examples, this may include coupling the first module plate to the second module plate, such that the at least one respective cable passes through the at least one aperture defined by the first module plate and the second module plate. The process may also include coupling the first module plate to the enclosure (before or after coupling the first module plate to the second module plate), and coupling the at least one of the plurality of panels to the frame, for example, with removable fasteners.

Although this subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. An entry module for facilitating passage of one or more cables into an enclosure, the entry module comprising:
    a first module plate comprising a first edge defining a first edge profile;
    a second module plate comprising a second edge defining a second edge profile; and
    a seal configured to provide a substantially fluid-resistant seal between each of the one or more cables, the first module plate and the second module plate,
    wherein at least one of the first module plate or the second module plate is independently removable from the enclosure to provide an opening between an exterior of the enclosure and an interior of the enclosure, the first module plate defining a first planar portion and the second module plate defining a second planar portion are configured to approach one another, such that the first planar portion and second planar portion are substantially coplanar and the first edge profile and the second edge profile define at least one aperture therebetween, and wherein the seal is compressed between the first planar portion and the second planar portion when the first module plate abuts the second module plate.

2. The entry module of claim 1, wherein the first module plate and the second module plate are configured to approach one another, such that the first edge profile and the second edge profile define a plurality of apertures therebetween.

3. The entry module of claim 2, wherein:
the first edge profile defines first aperture portions and first edge segments between at least some of the first aperture portions;
the second edge profile defines second aperture portions and second edge segments between at least some of the second aperture portions; and
the first module plate and the second module plate are configured to approach one another, such that at least some of the first edge segments approach at least some of the second edge segments, and at least some of the first aperture portions and at least some of the second aperture portions define the plurality of apertures.

4. The entry module of claim 1, wherein the at least one aperture is substantially circular.

5. The entry module of claim 1, further comprising an attachment bracket coupled to at least one of the first module plate or the second module plate, and configured to removably couple the entry module to an enclosure.

6. The entry module of claim 1, further comprising an attachment bracket removably coupling the first module plate and the second module plate to one another.

7. The entry module of claim 1, further comprising an attachment bracket configured to removably couple the first module plate and the second module plate to one another, and configured to removably couple the entry module to an enclosure.

8. The entry module of claim 1, wherein the first module plate defines a first remote edge opposite the first edge, and the second module plate defines a second remote edge opposite the second edge, and wherein the entry module further comprises at least one edge seal coupled to at least one of the first remote edge or the second remote edge.

9. An enclosure defining an interior and an exterior, the enclosure comprising:
a frame;
a plurality of panels coupled to the frame and configured to define the interior and the exterior of the enclosure;
a floor defining a bottom of the enclosure and comprising an entry module coupled to the enclosure and configured to facilitate passage of at least one cable into the enclosure, the entry module comprising:
a first module plate comprising a first edge defining a first edge profile; and
a second module plate comprising a second edge defining a second edge profile; and
a seal configured to provide a substantially fluid-resistant seat between each of the one or more cables, the first module plate and the second module plate,
wherein at least one of the first module plate or the second module plate is independently removable from the enclosure to provide an opening between the exterior of the enclosure and the interior of the enclosure, the first module plate defining a first planar portion and the second module plate defining a second planar portion are configured to approach one another, such that the first planar portion and second planar portion are substantially coplanar and the first edge profile and the second edge profile define at least one aperture therebetween, and
wherein the seal is compressed between the first planar portion and the second planar portion when the first module plate abuts the second module plate.

10. The enclosure of claim 9, wherein the first module plate and the second module plate approach one another, such that the first edge profile and the second edge profile define a plurality of apertures therebetween.

11. The enclosure of claim 10, wherein:
the first edge profile defines first aperture portions and first edge segments between at least some of the first aperture portions;
the second edge profile defines second aperture portions and second edge segments between at least some of the second aperture portions; and
the first module plate and the second module plate approach one another, such that at least some of the first edge segments approach at least some of the second edge segments, and at least some of the first aperture portions and at least some of the second aperture portions define the plurality of apertures.

12. The enclosure of claim 9, wherein the entry module further comprises an attachment bracket coupled to at least one of the first module plate or the second module plate, and removably coupled to the enclosure.

13. The enclosure of claim 9, wherein the entry module further comprises an attachment bracket removably coupling the first module plate and the second module plate to one another.

14. The enclosure of claim 9, wherein the entry module further comprises an attachment bracket removably coupling the first module plate and the second module plate to one another, and removably coupling the entry module to the enclosure.

15. The enclosure of claim 9, wherein:
the first module plate defines a first remote edge opposite the first edge;
the second module plate defines a second remote edge opposite the second edge;
the entry module further comprises at least one edge seal coupled to at least one of the first remote edge or the second remote edge; and
the edge seal provides a fluid-resistant seal between the at least one of the first remote edge or the second remote edge and the enclosure.

* * * * *

UNITED STATES PATENT AND TRADEMARK OFFICE
CERTIFICATE OF CORRECTION

| | |
|---|---|
| PATENT NO. | : 11,409,066 B2 |
| APPLICATION NO. | : 17/031051 |
| DATED | : August 9, 2022 |
| INVENTOR(S) | : William Julius McPhil Giraud et al. |

It is certified that error appears in the above-identified patent and that said Letters Patent is hereby corrected as shown below:

On the Title Page

Item (57), in Column 2, in "Abstract", Line 9, after "exterior" insert -- of --.

In the Claims

In Column 10, Line 2, in Claim 9, delete "seat" and insert -- seal --.

Signed and Sealed this
Sixth Day of December, 2022

Katherine Kelly Vidal
*Director of the United States Patent and Trademark Office*